United States Patent
Dahl et al.

(10) Patent No.: US 9,599,094 B2
(45) Date of Patent: Mar. 21, 2017

(54) METHOD OF MANUFACTURING AN AERODYNAMIC SHELL PART FOR A WIND TURBINE BLADE

(71) Applicant: LM WP PATENT HOLDING A/S, Kolding (DK)

(72) Inventors: Martin Dahl, Flensburg (DE); Lars Nielsen, Skanderborg (DK)

(73) Assignee: LM WP PATENT HOLDING A/S, Kolding (DK)

( * ) Notice: Subject to any disclaimer, the term of this patent is extended or adjusted under 35 U.S.C. 154(b) by 102 days.

(21) Appl. No.: 14/649,845

(22) PCT Filed: Dec. 18, 2013

(86) PCT No.: PCT/EP2013/077094
§ 371 (c)(1),
(2) Date: Jun. 4, 2015

(87) PCT Pub. No.: WO2014/096004
PCT Pub. Date: Jun. 26, 2014

(65) Prior Publication Data
US 2015/0314537 A1 Nov. 5, 2015

(30) Foreign Application Priority Data
Dec. 18, 2012 (EP) ..................... 12197879

(51) Int. Cl.
*B29C 70/44* (2006.01)
*B29C 70/48* (2006.01)
(Continued)

(52) U.S. Cl.
CPC ............ *F03D 1/0675* (2013.01); *B29C 33/60* (2013.01); *B29C 70/342* (2013.01); *B29C 70/48* (2013.01);
(Continued)

(58) Field of Classification Search
CPC ..... B29C 70/48; B29C 70/541; B29C 70/543; B29C 70/443; B29C 33/306; F03D 1/0675; B29D 99/0028; B29L 2031/085
(Continued)

(56) References Cited

U.S. PATENT DOCUMENTS 8,047,798 B2 * 11/2011 Bech ........................ F03D 1/065
416/230
8,328,976 B2 * 12/2012 Ren ........................ B29C 70/446
156/104
(Continued)

FOREIGN PATENT DOCUMENTS

CN 102536632 A 7/2012
EP 2444660 A1 4/2012
(Continued)

*Primary Examiner* — Robert B Davis
(74) *Attorney, Agent, or Firm* — Nath, Goldberg & Meyer; Jerald L. Meyer; Tanya E. Harkins

(57) ABSTRACT

A method of manufacturing an aerodynamic shell part for a wind turbine blade is described. The aerodynamic she part comprises a recess for arrangement and connection of a spar cap within said recess. The method comprising the steps of: a) providing a first mold part having a first forming surface that defines a part of an exterior of the aerodynamic shell part, b) laying up fiber-reinforcement material and optionally also sandwich core material in the first mold on the first forming surface, c) arranging one or more inserts having an exterior shape corresponding to at least sides of the recess of the aerodynamic shell part, d) supplying resin to said fiber-reinforcement material and optional sandwich core material, e) curing or preconsolidating the resin, and f) removing the one or more inserts.

15 Claims, 8 Drawing Sheets

(51) Int. Cl.
*B29C 70/54* (2006.01)
*B29C 33/30* (2006.01)
*F03D 1/06* (2006.01)
*B29C 70/34* (2006.01)
*B29C 33/60* (2006.01)
*B29D 99/00* (2010.01)
*F03D 1/00* (2006.01)
*B29K 105/08* (2006.01)
*B29K 63/00* (2006.01)
*B29K 307/04* (2006.01)
*B29L 31/08* (2006.01)
*B29K 67/00* (2006.01)
*B29K 309/08* (2006.01)

(52) U.S. Cl.
CPC .......... *B29C 70/541* (2013.01); *B29C 70/543* (2013.01); *B29D 99/0028* (2013.01); *F03D 1/001* (2013.01); *B29C 33/306* (2013.01); *B29C 70/443* (2013.01); *B29K 2063/00* (2013.01); *B29K 2067/00* (2013.01); *B29K 2105/08* (2013.01); *B29K 2105/0872* (2013.01); *B29K 2307/04* (2013.01); *B29K 2309/08* (2013.01); *B29L 2031/085* (2013.01); *Y02E 10/721* (2013.01); *Y02P 70/523* (2015.11)

(58) Field of Classification Search
USPC .......................................................... 249/102
See application file for complete search history.

(56) References Cited

U.S. PATENT DOCUMENTS

| | | | |
|---|---|---|---|
| 8,789,275 B2* | 7/2014 | Esaki | F03D 1/0675 29/889.7 |
| 2003/0019567 A1 | 1/2003 | Burpo | |
| 2008/0075603 A1* | 3/2008 | Van Breugel | B29C 65/542 416/232 |
| 2011/0142679 A1* | 6/2011 | Bendel | B29C 66/721 416/241 R |
| 2013/0312900 A1* | 11/2013 | Austinat | B29D 99/0028 156/245 |

FOREIGN PATENT DOCUMENTS

| | | |
|---|---|---|
| JP | 2000-179448 A | 6/2000 |
| WO | 2004078442 A1 | 9/2004 |
| WO | 2009010706 A1 | 1/2009 |
| WO | 2011035541 A1 | 3/2011 |

* cited by examiner

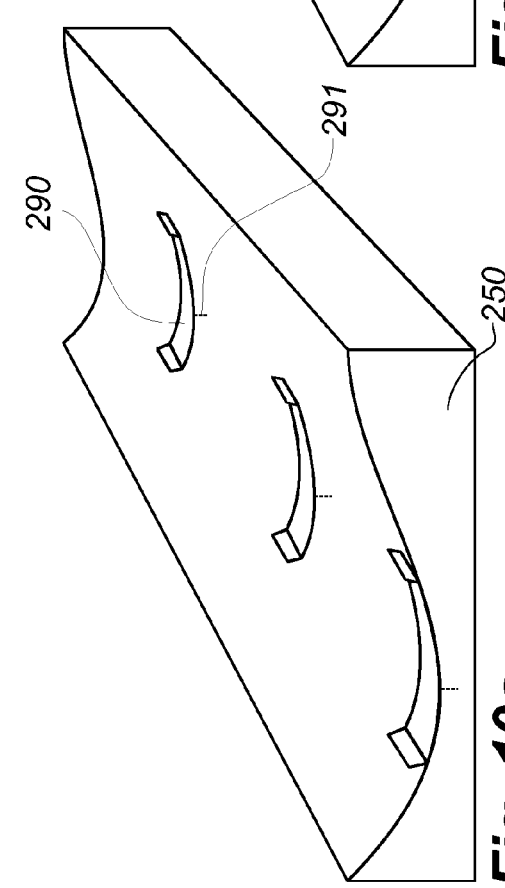
*Fig. 10a* *Fig. 10b* *Fig. 10c*
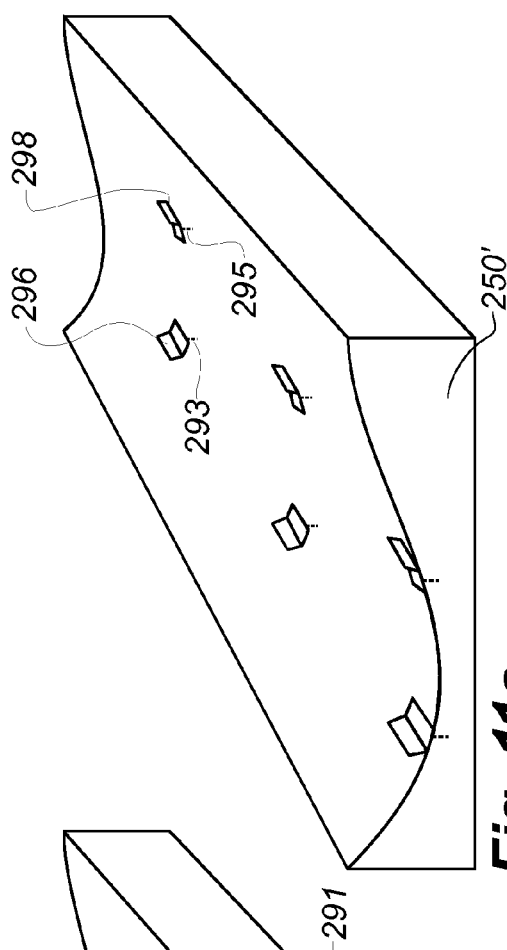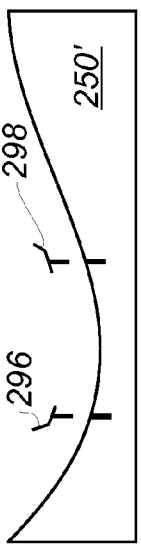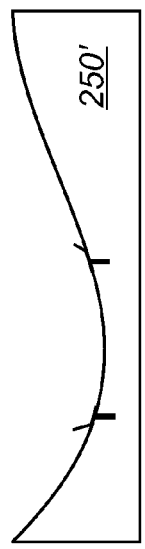
*Fig. 11a* *Fig. 11b* *Fig. 11c*

METHOD OF MANUFACTURING AN AERODYNAMIC SHELL PART FOR A WIND TURBINE BLADE

This is a National Phase Application filed under 35 U.S.C. 371 as a national stage of PCT/EP2013/077094, filed Dec. 18, 2013, an application claiming the benefit of EP Application No. 12197879.5, filed Dec. 18, 2012, the content of each of which is hereby incorporated by reference in its entirety.

TECHNICAL FIELD

The present invention relates to a method of manufacturing an aerodynamic shell part for a wind turbine blade. The invention further relates to a kit of parts for manufacturing the aerodynamic shell part.

BACKGROUND

Wind turbine blades are often manufactured according to one of two constructional designs, namely a design where a thin aerodynamic shell is glued onto a spar beam, or a design where spar caps, also called main laminates, are integrated into the aerodynamic shell.

In the first design, the spar beam constitutes the load bearing structure of the blade. The spar beam as well as the aerodynamic shell or shell parts are manufactured separately. The aerodynamic shell is often manufactured as two shell parts, typically as a pressure side shell part and a suction side shell part. The two shell parts are glued or otherwise connected to the spar beam and are further glued to each other along a leading edge and trailing edge of the shell parts. This design has the advantage that the critical load carrying structure may be manufactured separately and therefore easier to control. Further, this design allows for various different manufacturing methods for producing the beam, such as moulding and filament winding.

In the second design, the spar caps or main laminates are integrated into the shell and are moulded together with the aerodynamic shell. The main laminates typically comprise a high number of fibre layers compared to the remainder of the blade and may form a local thickening of the wind turbine shell, at least with respect to the number of fibre layers. Thus, the main laminate may form a fibre insertion in the blade. In this design, the main laminates constitute the load carrying structure. The blade shells are typically designed with a first main laminate integrated in the pressure side shell part and a second main laminate integrated in the suction side shell part. The first main laminate and the second main laminate are typically connected via one or more shear webs, which for instance may be C-shaped or I-shaped. For very long blades, the blade shells further along at least a part of the longitudinal extent comprise an additional first main laminate in the pressure side shell, and an additional second main laminate in the suction side shell. These additional main laminates may also be connected via one or more shear webs. This design has the advantage that it is easier to control the aerodynamic shape of the blade via the moulding of the blade shell part.

Vacuum infusion or VARTM (vacuum assisted resin transfer moulding) is one method, which is typically employed for manufacturing composite structures, such as wind turbine blades comprising a fibre reinforced matrix material.

During the process of filling the mould, a vacuum, said vacuum in this connection being understood as an underpressure or negative pressure, is generated via vacuum outlets in the mould cavity, whereby liquid polymer is drawn into the mould cavity via the inlet channels in order to fill said mould cavity. From the inlet channels the polymer disperses in all directions in the mould cavity due to the negative pressure as a flow front moves towards the vacuum channels. Thus, it is important to position the inlet channels and vacuum channels optimally in order to obtain a complete filling of the mould cavity. Ensuring a complete distribution of the polymer in the entire mould cavity is, however, often difficult, and accordingly this often results in so-called dry spots, i.e. areas with fibre material not being sufficiently impregnated with resin. Thus dry spots are areas where the fibre material is not impregnated, and where there can be air pockets, which are difficult or impossible to remove by controlling the vacuum pressure and a possible overpressure at the inlet side. In vacuum infusion techniques employing a rigid mould part and a resilient mould part in the form of a vacuum bag, the dry spots can be repaired after the process of filling the mould by puncturing the bag in the respective location and by drawing out air for example by means of a syringe needle. Liquid polymer can optionally be injected in the respective location, and this can for example be done by means of a syringe needle as well. This is a time-consuming and tiresome process. In the case of large mould parts, staff have to stand on the vacuum bag. This is not desirable, especially not when the polymer has not hardened, as it can result in deformations in the inserted fibre material and thus in a local weakening of the structure, which can cause for instance buckling effects.

In most cases the polymer or resin applied is polyester, vinyl ester or epoxy, but may also be PUR or pDCPD, and the fibre reinforcement is most often based on glass fibres or carbon fibres. Epoxies have advantages with respect to various properties, such as shrinkage during curing (in turn potentially leading to less wrinkles in the laminate), electrical properties and mechanical and fatigue strengths. Polyester and vinyl esters have the advantage that they provide better bonding properties to gelcoats. Thereby, a gelcoat may be applied to the outer surface of the shell during the manufacturing of the shell by applying a gelcoat to the mould before fibre-reinforcement material is arranged in the mould. Thus, various post-moulding operations, such as painting the blade, may be avoided. Further, polyesters and vinyl esters are cheaper than epoxies. Consequently, the manufacturing process may be simplified and costs may be lowered.

Often the composite structures comprise a core material covered with a fibre reinforced material, such as one or more fibre reinforced polymer layers. The core material can be used as a spacer between such layers to form a sandwich structure and is typically made of a rigid, lightweight material in order to reduce the weight of the composite structure. In order to ensure an efficient distribution of the liquid resin during the impregnation process, the core material may be provided with a resin distribution network, for instance by providing channels or grooves in the surface of the core material.

As for instance blades for wind turbines have become bigger and bigger in the course of time and may now be more than 60 meters long, the impregnation time in connection with manufacturing such blades has increased, as more fibre material has to be impregnated with polymer. Furthermore the infusion process has become more complicated, as the impregnation of large shell members, such as blades, requires control of the flow fronts to avoid dry spots, said control may e.g. include a time-related control of inlet channels and vacuum channels. This increases the time required for drawing in or injecting polymer. As a result the polymer has to stay liquid for a longer time, normally also resulting in an increase in the curing time.

Resin transfer moulding (RTM) is a manufacturing method, which is similar to VARTM. In RTM the liquid resin is not drawn into the mould cavity due to a vacuum generated in the mould cavity. Instead the liquid resin is forced into the mould cavity via an overpressure at the inlet side.

Prepreg moulding is a method in which reinforcement fibres are pre-impregnated with a pre-catalysed resin. The resin is typically solid or near-solid at room temperature. The prepregs are arranged by hand or machine onto a mould surface, vacuum bagged and then heated to a temperature, where the resin is allowed to reflow and eventually cured. This method has the main advantage that the resin content in the fibre material is accurately set beforehand. The prepregs are easy and clean to work with and make automation and labour saving feasible. The disadvantage with prepregs is that the material cost is higher than for non-impregnated fibres. Further, the core material need to be made of a material, which is able to withstand the process temperatures needed for bringing the resin to reflow. Prepreg moulding may be used both in connection with a RIM and a VARTM process.

Further, it is possible to manufacture hollow mouldings in one piece by use of outer mould parts and a mould core. Such a method is for instance described in EP 1 310 351 and may readily be combined with RTM, VARTM and prepreg moulding.

DISCLOSURE OF THE INVENTION

It is an object of the invention to obtain partly a new blade design and intermediary products of this design as well as a new method for manufacturing such wind turbine blades and intermediary products, and which overcomes or ameliorates at least one of the disadvantages of the prior art or which provides a useful alternative.

According to a first aspect, the invention provides a method for manufacturing the aforementioned aerodynamic shell with a recess. Accordingly, the invention provides a method of manufacturing an aerodynamic shell part for a wind turbine, the aerodynamic shell part comprising a recess for arrangement and connection of a spar cap within said recess, said method comprising the steps of: a) providing a first mould part having a first forming surface that defines a part of an exterior of the aerodynamic shell part, b) laying up fibre-reinforcement material and optionally also sandwich core material in the first mould on the first forming surface, c) arranging one or more inserts having an exterior shape corresponding to at least sides of the recess of the aerodynamic shell part, d) supplying resin to said fibre-reinforcement material and optional sandwich core material, e) curing or preconsolidating the resin, and f) removing the one or more inserts.

The resin may in step d) be supplied to the fibre materials via prepregs, i.e. simultaneous with layup of the fibre-reinforcement material, or be supplied afterwards. It is also possible to use a combination of prepregs and additional resin supplied to the fibre material. The resin is preferably cured before the one or more inserts are removed leaving an impression or recess in the aerodynamic shell part.

This manufacturing method provides a simple way of forming the aerodynamic shell with a recess at the correct position and for connecting the spar cap at the correct position to the blade shell. Further, the insert ensures that fibre material and sandwich core material does not slide down from the sides of the mould and cause wrinkles in the layup.

The one or more inserts may for instance be shaped as a dummy that corresponds to at least an exterior shape of the spar cap, which is to be inserted and connected to the recess. This provides for a simple way of ensuring that the shape of the recess substantially corresponds to the shape of the spar cap.

Accordingly, the one or more inserts has an exterior shape that corresponds at least to an outer surface of the spar cap.

The insert of dummy may be formed as a single element that corresponds to the entire recess. Alternatively, it may be composed of a number of separate inserts that each form a separate longitudinal section of the recess. Accordingly, the one or more inserts may comprise a first insert that forms at least a part of a first side of the recess, and a second insert that forms at least a part of a second side of the recess. Similar to the dummy, the first insert and the second insert may form the entire first side and the second side of the recess, respectively. Alternatively, they may be formed by a number of first side inserts and second side inserts, each forming a longitudinal section of the first side and the second side of the recess, respectively. The individual inserts may also be separated in the longitudinal section with a mutual spacing, thus only being arranged along parts of the recess. In such an embodiment, the individual parts still serve to ensure that the position of the recess is formed very accurately and to ensure that fibre material and sandwich core parts do not slide down from sides of the moulding surface.

Advantageously, a releasing material, such as a waxy substance, is applied to said one or more insert in order to prevent said one or more inserts to adhere to material of the aerodynamic shell.

As previously mentioned, the method may comprise the use of vacuum infusion, such as Vacuum Assisted Resin Transfer Moulding (VARTM.)

In one embodiment, a vacuum bag is applied over the fibre-reinforcement material and the optional sandwich core material as well as one or more inserts and sealed to the first mould part.

A mould cavity is thus formed between the first, advantageously rigid, mould part and the first vacuum bag. The fibre-reinforcement material, the optional sandwich core material, and the one or more inserts are thus arranged in the mould cavity. The mould cavity is attached to a vacuum source that first evacuates the mould cavity. Thereby the material arranged in the mould cavity is compressed due to the forces applied from the vacuum bag. This also ensures that the one or more inserts are pressed against the fibre-reinforcement material, thereby providing an impression according to the intended recess.

In another embodiment, a first vacuum bag is applied over the fibre-reinforcement material and the optional sandwich core material, and wherein the one or more inserts are arranged on top of the first vacuum bag, and wherein a second vacuum bag is arranged on top of the one or more inserts.

The first and second vacuum bags are sealed in order to form a first mould cavity and a second mould cavity. The two mould cavities are first evacuated. Then the resin is brought to flow and/or injected into the first mould cavity, thereby wetting the fibre material. Afterwards the resin is pre-consolidated or cured, and the inserts may be removed together with the vacuum bags. This embodiment has the advantage of easy removal of the inserts without having to apply a releasing material or coating to the one or more inserts.

The one or more inserts may extend along the entire longitudinal extent of the recess. The one or more inserts may form separate longitudinal sections of the recess. The one or more inserts are arranged so that they adjoin each other, alternatively they may be arranged with a mutual spacing in the longitudinal direction.

The invention also provides a kit of parts for manufacturing an aerodynamic shell part of a wind turbine blade, the aerodynamic shell part comprising a recess for arrangement and connection of a spar cap within said recess, where the kit of parts comprises: a first mould a first mould part having a first forming surface that defines a part of an exterior of the aerodynamic shell part, and one or more inserts having an exterior shape corresponding to at least sides of the recess of the aerodynamic shell part.

The first mould part may comprise alignment means, such as markings, for arranging and aligning the one or more inserts on the first forming surface.

The first moulding surface and the one or more inserts may be provided with mating connection means so that the one or more insert may be connected to the first moulding surface of the first mould part. The first moulding surface is provided with openings, such as holes, and the one or more inserts may provided with attachment means, such as pins, which may engage with the openings in the first moulding surface. Thus, the one or more inserts may be fixed to the first mould part so that they are able to carry the weight of the fibre material and sandwich core material so that said material does not slide down from the sides of the first forming surface during layup.

The openings in the forming surface of the mould part may be provided with a vacuum pump to apply vacuum, when vacuum is applied to the mould cavity. The openings may be provided with valve, which may be closed when resin is later injected into the mould cavity. The valves may after curing be re-opened so that the inserts may easily be removed again.

The inserts may be made of aluminium or a polypropylene material, or another material, which the resin does not adhere to. The inserts may be treated with wax or a non-slip material for easy removal of the inserts.

However, it is also contemplated that the inserts may be used without needing to mechanically fix the inserts to the forming surface of the mould part. In such a situation, the mould part may be provided with markers only. Also, it may be possible to project tracer lines from an optical source, such as an infrared light source, into the mould so as to help arranging and aligning the inserts.

According to another aspect, the invention provides a wind turbine blade comprising a load carrying structure including at least a first spar cap, and an aerodynamic shell having an outer surface forming at least part of an exterior surface of the wind turbine blade and an inner surface, wherein the load carrying structure is connected to the aerodynamic shell, and wherein the aerodynamic shell comprises a first recess at the inner surface of the blade shell, and the first spar cap is arranged in and connected to the first recess of the aerodynamic shell. The aerodynamic shell comprises a first thickened part at a first side of the first recess and a second thickened part at a second side of the first recess. The first recess is tapered towards the first side of the recess and tapered towards the second side of the recess. The first spar cap is tapered towards a first side of the spar cap, and is tapered towards a second side of the spar cap. The first side of the spar cap substantially abuts or adjoins the first side of the recess, and the second side of the spar cap substantially abuts or adjoins the second side of the recess.

Thus, it is seen that the first thickened part may be tapered towards (the first side of) the recess, and the second thickened part may be tapered towards (the second side of) the recess, and that the sides of the spar cap are tapered correspondingly, such that the spar cap when arranged in the recess abuts the sides of the recess. Thereby, a gradual transition between the spar cap and the shell structure at the recess may be obtained with low transition in stiffness thereby lowering stress concentrations in the final wind turbine blade.

The tapering angle of the sides of the recess may for instance be between 10 and 80 degrees. Similarly, the tapering angle of the side of the spar cap may be between 10 and 80 degrees.

By manufacturing the aerodynamic shell and the spar cap separately and later attaching the spar cap to the recess of the aerodynamic shell, it is ensured that the load carrying structure may very accurately be positioned in the finished blade and that a gradual stiffness transition is achieved between the tapered parts of the spar cap and aerodynamic shell.

It is clear that the wind turbine blade is formed as an elongated structure having a longitudinal direction. Both the aerodynamic shell and the load carrying structure are therefore also formed as elongated structures connected to each other along a connection surface extending in the longitudinal direction of the blade. Thus, it is also clear that the recess extends in the longitudinal direction of the blade and the aerodynamic shell.

The design with a recess provided in the blade shell and the spar cap attached to the recess allows for a manufacturing process, where the spar cap and the aerodynamic shell may be manufactured separately, and where the spar cap may very accurately be attached to the blade shell at the correct position.

According to an advantageous embodiment, the load carrying structure further comprises a second spar cap, and the aerodynamic shell further comprises a second recess at the inner surface of the blade shell, and wherein the second spar cap is arranged in and connected to the second recess of the aerodynamic shell.

The first recess may be formed in a pressure side she part of the aerodynamic shell, and the second recess may be formed in a suction side she part of the aerodynamic shell. Thus, it is clear the first spar cap forms a load carrying structure part attached to the pressure side of the blade, and the second spar cap forms a load carrying structure part attached to the suction side of the blade.

The first thickened part and/or the second thickened part may be formed as a sandwich structure comprising a number of outer skin layers, a number of inner skin layers, and an intermediate sandwich core material.

Thus, the recess may be formed by having a non-thickened part (or recess shell part) between the first thickened part and the second thickened part. The recess shell part may simply comprise a number of fibre layers, e.g. corresponding to the inner and outer skin of the juxtaposed thickened parts.

The intermediate sandwich core material may be balsawood. The intermediate core material may also be foamed polymer.

All the embodiments described in elation to the first spar cap and the first recess may of course also apply to the second recess and the second spar cap.

The spar cap may for instance be formed according to any of the embodiments described with a sandwich core wedge at the sides.

According to an advantageous embodiment, the sandwich core material of the spar cap(s) is a foamed polymer, and the sandwich core material of the aerodynamic shell is balsawood. This provides for an embodiment, where the blade shell may be manufactured with the less expensive balsawood. However, balsawood may be electrically conductive. By providing a foamed polymer material at the sides of the spar cap, it is possible to electrically insulate the main laminate from the balsawood, which for lightning protection purposes may be advantageous, in particular if the spar cap comprises carbon fibres.

According to another advantageous embodiment, the first spar cap comprises a first lip or wing arranged along a first side of the first spar cap, and a second lip or wing arranged along a second side of the first spar cap. The first lip (or wing) and the second lip (or wing) are formed as protrusions extending from and along the first side and second side of the first spar cap. The first lip and the second lip may be formed as fibre-reinforced structures.

In one embodiment, the first fibre lip is attached to an inner surface of the first thickened part of the aerodynamic shell, and wherein the second fibre lip is attached to an inner surface of the second thickened part of the aerodynamic shell.

In another embodiment, a cavity is formed between an inner surface, the recess and the first surface of the spar cap. The cavity may be formed by the tapering sides of the spar cap and recess and/or it may be formed by the first fibre lip and second fibre lip.

Further the lips or protruding elements may act as a glue barrier so that only the needed glue may be injected into the cavity or that excess glue may be removed by injecting glue from one longitudinal end of the cavity and collecting said excess glue at a second end of the cavity.

The spar cap may be connected to the recess of the shell via an adhesive filling the cavity. In practice the adhesive may be applied before the spar cap is arranged in the recess or it may be injected into a cavity formed between the spar cap and the recess.

The invention also provides a method of manufacturing a wind turbine blade, wherein the method comprises the steps of: a) manufacturing an aerodynamic shell having with a first recess, the aerodynamic shell being manufactured so that it comprises a first thickened part at a first side of the first recess and a second thickened part at a second side of the first recess, and so that the first recess is tapered towards the first side of the recess and tapered towards the second side of the recess, b) manufacturing a load carrying structure including at least a first spar cap, the first spar cap being manufactured so that it is tapered towards a first side of the spar cap and further is tapered towards a second side of the spar cap, c) arranging the first spar cap in the first recess of the aerodynamic shell so that the first side of the spar cap substantially abuts or adjoins the first side of the recess, and the second side of the spar cap substantially abuts or adjoins the second side of the recess, and d) connecting the first spar cap to the aerodynamic shell. Advantageously, in step d), the first spar cap is glued to the aerodynamic shell.

According to yet another aspect, the invention provides a wind turbine blade comprising: a load carrying structure including at least a first spar cap, and wherein the first spar cap is pre-manufactured as a fibre-reinforced object comprising a first fibre reinforcement material and a first matrix material, and an aerodynamic shell made in a fibre-reinforced material comprising a second fibre reinforcement material and a second matrix material, wherein the load carrying structure is connected to the aerodynamic shell, and wherein the second matrix material is a polyester or vinylester, and the first matrix material is a polymer material other than polyester or vinylester. The aerodynamic shell is a thin shell that defines the exterior contour of the wind turbine blade and accordingly the aerodynamic shape of the blade.

The second matrix material may advantageous be an epoxy-based resin. In one embodiment, the second matrix material (e.g. the epoxy-based resin) is a heat curing resin as opposed to one curing through a catalytic chemical reaction, e.g. producing exothermic heat. The heat curing resin may advantageously be a thermosetting resin, but may in principle also be a thermoplastic.

Thus, according to a highly advantageous embodiment, the shell is manufactured via a resin that cures through a catalytic chemical reaction, e.g. an exothermic chemical reaction. The spar cap on the other hand is manufactured and cured via a heat activated resin, such as an epoxy. Thereby, the aerodynamic shell may be manufactured via relative cheap materials and moulds, whereas the spar cap may be manufactured in heated moulds and matrix materials that have advantages with respect to inter alia shrinkage (in turn leading to less wrinkles in the laminate), electrical properties and mechanical and fatigues strengths. Further, the manufacture of the shell and the manufacture of the critical load carrying structure are separated from each other meaning that it is easier to have control over the manufacture of the individual structures. Thus, a cost optimised manufacturing approach is set up for manufacturing the blade shell, while ensuring optimised mechanical properties for the most critical part of the load carrying structure of the blade, namely the spar cap. Further, the spar cap may be manufactured via a much narrower mould. Thus, if necessary, subsequent repairs may more easily be carried out without having to walk around on the fibre-reinforcement material.

According to an advantageous embodiment, the first matrix material is an epoxy based resin. According to another advantageous embodiment, the first fibre reinforcement material comprises carbon fibres. Thereby, the load carrying structure can be made relatively stiff compared to the weight and amount of fibre-reinforcement material used for the load carrying structure. Thus, the blade can be made lighter andior less elastic, thereby lowering moments transferred to the hub and the rest of the wind turbine as well as lowering the risk of the blades deflecting to a degree, where they may collide with the tower of the wind turbine during rotation of the rotor. Further, carbon fibres are compatible with epoxy resins, thus providing a good mechanical bonding in the matrix material. Overall, the use of carbon fibres makes it feasible to manufacture longer or lighter blades as compared to for instance glass fibre reinforced blades without prebending the blades so as to curve away from the tower in their unstressed state.

It is clear that the wind turbine blade is formed as an elongated structure having a longitudinal direction. Both the aerodynamic shell and the load carrying structure are therefore also formed as elongated structures connected to each other along a connection surface extending in the longitudinal direction of the blade.

The aerodynamic shell may advantageously be formed as a thin or relatively thin shell.

The first fibre-reinforcement material may substantially be composed of carbon fibres. However, the spar cap may also comprise hybrid mats comprising both carbon fibres and glass fibres. According to an advantageous embodiment, the reinforcement fibres of the spar cap comprise at least 25%, or at least 30%, or at least 35%, or at least 40%, or at least 50%, or at least 60%, or at least 70%, or at least 80%, or at least 90% carbon fibres. The reinforcement fibres may even be fully constituted by carbon fibres. In an advantageous embodiment, hybrid mats comprising both glass fibres and carbon fibres are used, wherein approximately 35% by volume of the total amount of fibres are carbon fibres.

According to one embodiment, the second fibre reinforcement material is glass fibres. Glass fibres are compatible with polyester based resins, thus providing a good mechanical bonding in the matrix material. Accordingly, the aerodynamic shell may be made from relatively inexpensive materials compared to for instance carbon fibres and epoxy based resins.

According to a highly advantageous embodiment, an outer surface of the aerodynamic shell is coated with a gelcoat. Gelcoats may readily be applied to polyester or vinylester based composites, since the polyester and vinylester may chemically bond with the styrene of the gelcoat. Thereby, the aerodynamic shell comprising a polyester or vinylester based resin as matrix material has the advantage that the gelcoat may be applied to the outer surface of the shell during the manufacturing of the shell, e.g. by applying the gelcoat to the mould surface before laying up the fibre-reinforcement material. Thereby, various post-moulding operations, such as painting the blade, may be avoided, whereby the manufacturing process may be simplified and costs may be lowered.

Thus, it is seen that the combination of carbon fibre reinforced spar caps connected to an advantageously thin aerodynamic shell made in glass fibre reinforced polyester and covered by a gel coat provides the possibility of manufacturing relatively stiff and longer blades, where the post-moulding operations are simplified.

According to one embodiment, the first spar cap is adhered to the aerodynamic shell, advantageously by an epoxy based adhesive.

According to another embodiment, the load carrying structure further comprises a second spar cap. In one advantageous embodiment, the first spar cap and the second spar cap are connected via at least a first shear web, advantageously also a second shear web. The first shear web and/or the second shear web may advantageously be a C-shaped web or an l-shaped web. Thus, it is clear that the spar caps and webs may be manufactured separately and then later connected to each other, e.g. by gluing the parts to each other, in order to form the load carrying structure. The aerodynamic shell may then later be connected to the load carrying structure.

According to yet another embodiment, the aerodynamic shell is made of at least a first shell part, e.g. a suction side shell part, and a second shell part, e.g. a pressure side she part. The first shell part and the second shell part may for instance be connected to each other along bond lines along a leading edge and a trailing edge of the wind turbine blade.

It is possible to manufacture the first spar caps separately and connecting or adhering them to the shell parts. Thus, the first spar cap may be connected to the first shell part, and the second spar cap may be connected to the second shell part. Afterwards, the shell parts comprising the spar caps may be adhered to each other with the shear webs arranged between the spar caps.

In an alternative embodiment, the load carrying structure is a spar or a beam. This provides an alternative embodiment, where the load carrying structure may be formed as a single integral structure, e.g. a box-shaped or circular cylindrical spar, and the thin aerodynamic shell is adhered to the load carrying structure afterwards.

The invention also provides a method of manufacturing a wind turbine blade, wherein the method comprises the steps of: a) manufacturing a load carrying structure including at least a first spar cap as a fibre-reinforced object comprising a first fibre reinforcement material and a first matrix material, b) manufacturing an aerodynamic shell as a fibre reinforcement material comprising a second fibre reinforcement material and a second matrix material, and c) connecting the load carrying structure to the aerodynamic shell, wherein the second matrix material is a polyester or vinylester, and the first matrix material is a polymer material other than polyester or vinylester.

According to an advantageous embodiment of the method, step a) includes the step of supplying and curing the first resin in order to form the load carrying structure. In another advantageous embodiment, step b) includes the step of supplying and curing the polyester or vinylester in order to form the aerodynamic shell. In yet another advantageous embodiment, step c) comprises the step of adhering the load carrying structure to the aerodynamic shell, e.g. via an epoxy-based adhesive.

The first spar cap and/or the aerodynamic shell may advantageously be manufactured via a vacuum assisted resin transfer moulding (VARTM) process. The aerodynamic shell may be manufactured in a first mould part. The first spar cap may be manufactured in a second mould part. If the aerodynamic shell is manufactured as separate shell parts, such as a pressure side shell part and a suction side shell part that are later adhered to each other along the leading edge and trailing edge of the blade, the separate shell parts may of course be manufactured in separate first mould parts.

Further, it is clear that the various composite structures in a VARTM method may use a mould structure comprising a rigid mould part and a vacuum bag sealed to the rigid mould part in order to form a mould cavity there between. The fibre-reinforcement material is arranged in the mould cavity, and the matrix material, i.e. the resin, is supplied to the mould cavity.

The resin may either be provided in combination with the fibre-reinforcement material as prepregs. Alternatively, the fibre-reinforcement material may be arranged in dry form and the resin be supplied to afterwards. It is also possible to use a combination of prepregs and additional resin supplied to the fibre-reinforcement material to improve wetting.

In one embodiment, step a) further comprises the step of manufacturing a second spar cap as well as one or more shear webs and connecting said one or more shear webs between the first spar cap and the second spar cap. In another embodiment, step b) includes the step of providing a gel coat to an outer surface of the aerodynamic shell.

Typically, the gel coat will be applied to the forming surface of the mould prior to the fibre-reinforcement material being laid up in the mould.

According to another aspect, the invention also provides a pre-manufactured spar cap for connecting to an aerodynamic shell, the spar cap comprising an elongated structure oriented along a longitudinal axis and having a first surface for connecting to an aerodynamic shell, a second surface facing opposite the first surface, a first side, and a second side opposite the first side, wherein the spar cap comprises a main laminate comprising a number of fibre-reinforcement layers between the first surface and the second surface and embedded in a polymer matrix, and wherein the spar cap further comprises a first sandwich core material at the first side of the spar cap and contiguous to the main laminate, the first sandwich core material being tapered in a direction towards the main laminate so as to provide a gradual transition between the first core material and the main laminate.

This pre-manufactured spar cap provides for an improved stiffness transition and stress transition, when it is attached to an aerodynamic shell. This in particular relates to attachment to aerodynamic shells having a sandwich construction with a sandwich core material, e.g. adjoining the pre-manufactured spar cap in the final wind turbine blade.

The first sandwich core material may be sandwiched between an inner and outer skin. The terms "inner" and "outer" are to be understood in relation to the finished wind turbine blade. Thus, the inner skin is the side facing towards the interior of the blade when attached to the aerodynamic shell, whereas the outer skin is the side facing towards the aerodynamic shell.

According to an advantageous embodiment, the pre-manufactured spar cap may further comprise a second sandwich core material at the second side of the spar cap and adjoining the main laminate, the second sandwich core material being tapered in a direction towards the main laminate so as to provide a gradual transition between the second core material and the main laminate. Accordingly, it is seen that the spar cap may be manufactured with a centrally arranged main laminate and sandwich core material at both sides of the spar cap.

By main laminate is meant a fibre insertion comprising preferably a plurality of fibre-reinforcement layers that form a load carrying structure of the finished wind turbine blade.

The first core material may additionally be tapered towards the first side of the spar cap. The second core material may also be tapered towards the second side of the spar cap. Thus, it is seen that core material may cross-sectionally be shaped as a wedge or a double-wedge.

The main laminate may also be tapered towards the first side/and or the second side. This may for instance be achieved by letting side edges of the fibre-reinforcement layers be mutually displaced and/or letting the width of the various layers vary through the thickness of the main laminate. This provides a particular advantageous embodiment, where a gradual stiffness transition is achieved between the sandwich core material and the main laminate. In addition, sides of the individual layers may be tapered or chamfered.

The sandwich core material may for instance be balsa-wood or a foamed polymer.

The transition between the main laminate and the first sandwich core material and/or second sandwich core material may be angled at a tapering angle of 10 to 80 degrees.

The term pre-manufactured means that the spar cap is manufactured separately before being connected, e.g. by adhesion, to the aerodynamic shell. The pre-manufactured spar cap may be pre-consolidated or preferably pre-cured.

It is clear that the intermediate product of the spar cap provided with lips or wings is new and inventive in itself. Thus, according to yet another aspect, the invention provides a pre-manufactured spar cap for connecting to an aerodynamic shell, the spar cap comprising an elongated structure oriented along a longitudinal axis and having a first surface for connecting to an aerodynamic shell, a second surface facing opposite the first surface, a first side, an a second side opposite the first side, wherein the first spar cap comprises a first lip arranged along the first side of the first spar cap, and a second lip arranged along the second side of the first spar cap.

The first lip and the second lip are formed as protrusions extending from and along the first side and second side of the first spar cap. The first lip and the second lip may be formed as fibre-reinforced structures.

It is clear that the aforementioned aspects of the invention may be combined in any way and are linked by the common aspect of separating the manufacture of the aerodynamic shell and the load carrying structure. It is also clear that the third, fourth and fifth embodiments further are linked by a common inventive concept of forming a blade by providing a recess in the aerodynamic shell for insertion and attachment of a spar cap as well as intermediary products particularly suited for such a design.

It is clear that the invention is particularly suited for large structures. Accordingly, the invention preferably relates to wind turbine blades as well as intermediary structures having a total length of at least 30 meters, 40 meters, 45 meters, or 50 meters.

The invention also contemplates a wind turbine blade comprising a number of blades, e.g. two or three, according to any of the aforementioned aspects and embodiments.

BRIEF DESCRIPTION OF THE DRAWINGS

The invention is explained in detail below with reference to an embodiment shown in the drawings, in which

FIG. 10 shows a first embodiment of a kit of parts for manufacturing an aerodynamic shell part, FIG. 11 shows a second embodiment of a kit of parts for manufacturing an aerodynamic shell part.

DETAILED DESCRIPTION OF THE INVENTION

Figure 1:
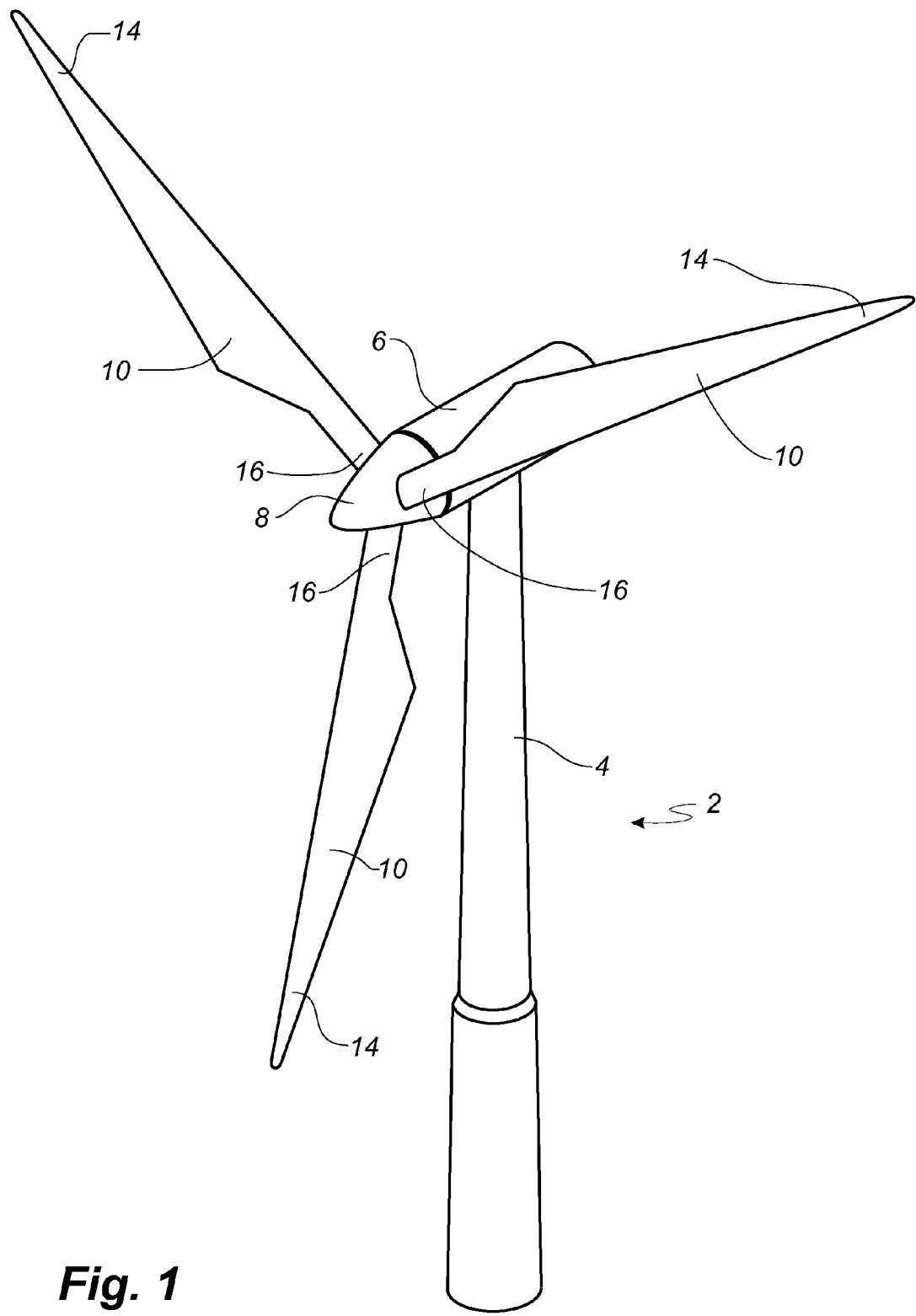
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

Figure 2:
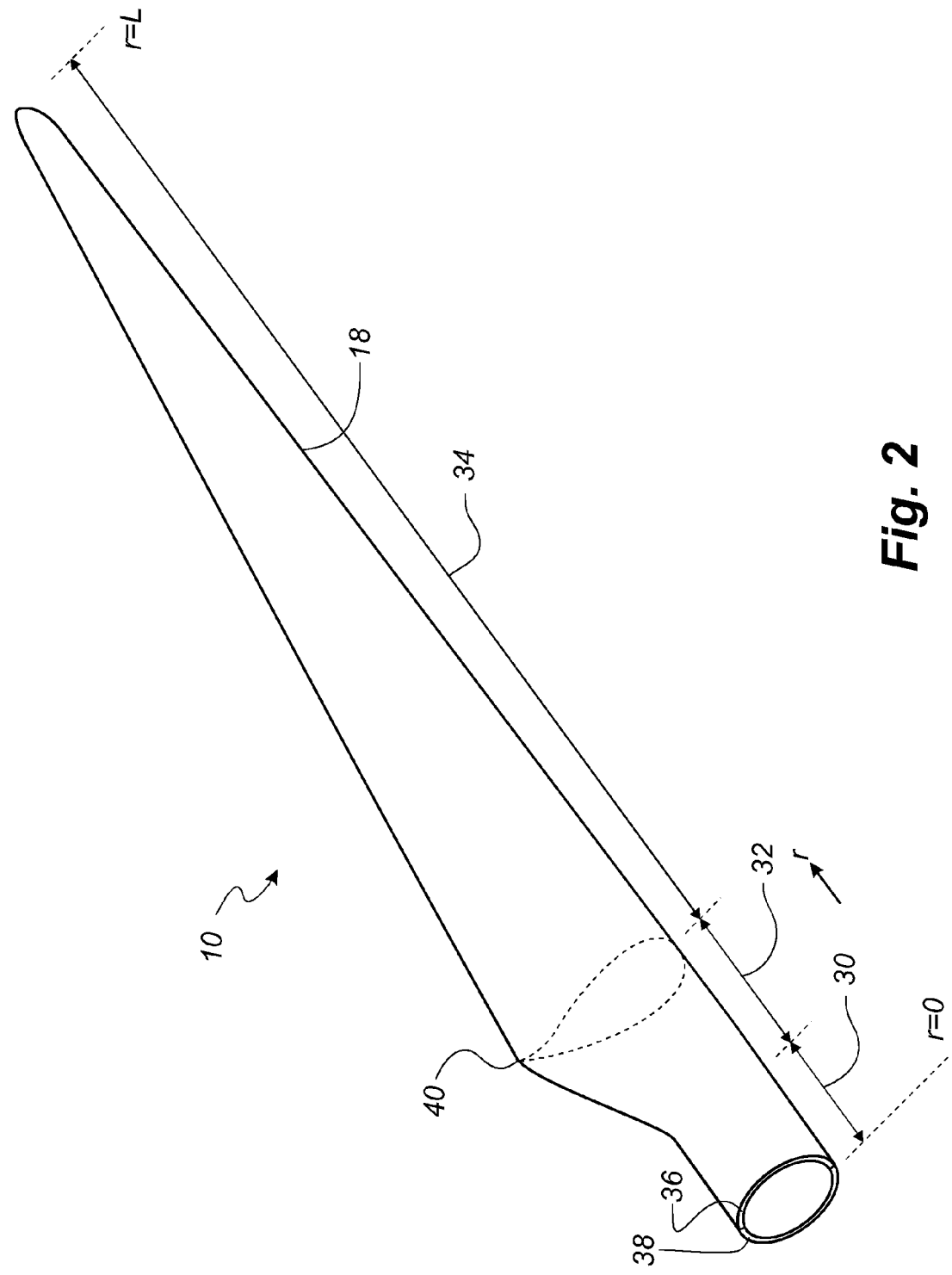
FIG. 2 shows a schematic view of a wind turbine blade according to the invention.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge of the blade 20.

Figure 3:
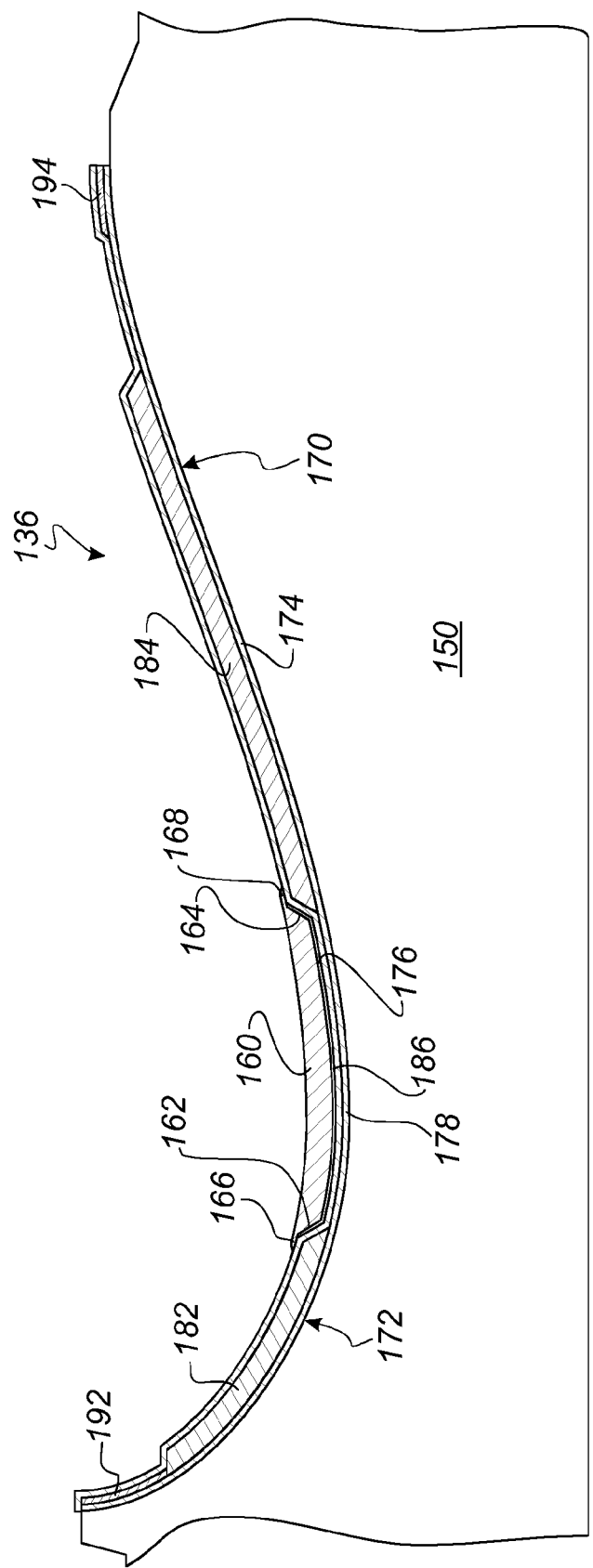
FIG. 3 shows an aerodynamic shell part and a spar cap arranged in a mould.

FIG. 3 shows a cross-sectional view through a first mould part 150 for use in a method of manufacturing a wind turbine blade. The first mould part 150 comprises a first moulding surface, which defines an outer surface of the finished wind turbine blade, here shown as the pressure side of the blade.

A number of first fibre layers, core parts and reinforcement sections are arranged at the forming surface, these parts being included in a first aerodynamic shell part (or pressure side shell part) 136 of the wind turbine blade. The aerodynamic shell part 136 may for instance be manufactured by first applying a waxy substance to the moulding surface in order to be able to remove the shell part after moulding. Then a gelcoat may be applied to the surface after a number of outer skin layers 178, e.g. made of fibre glass layers, are arranged in the mould. A first intermediate sandwich core material 182 and a second intermediate sandwich core material 184, such as balsawood, are arranged on top of the outer skin layers 178 in order to form a first thickened portion 172 and a second thickened portion 174 of the first aerodynamic shell part 136, respectively. In effect a first recess 176 is formed between the two thickened portions 172, 174. Subsequently, a number of inner skin layers 180, e.g. glass fibres, is arranged on top of the outer skin layers 178 and the first and second intermediate sandwich core material 182, 184. In addition a number of fibre layers, e.g. glass fibres, may be sandwiched between the outer skin layers 178 and the inner skin layers 180 in order to form a leading edge reinforcement 192 and/or a trailing edge reinforcement 194.

Finally a vacuum bag (not shown) is applied on top of the fibre material and sandwich material and sealed against the first form part 150 in order to form a mould cavity between the first mould part 150 and the vacuum bag. The mould cavity is then evacuated by use of a vacuum source (not shown) and resin is supplied to the mould cavity via resin inlets (not shown) in order to fully wet the fibre material. Finally, the resin is cured in order to form the first aerodynamic shell part 136.

After the first aerodynamic shell part 136 has been manufactured, a pre-manufactured first spar cap 160 is arranged in the first recess 176 of the first aerodynamic shell part 136. The pre-manufactured first spar cap 160 may advantageously have been manufactured with a first lip or wing 166 protruding from a first side 162 of the first spar cap 160 and a second lip or wing 168 protruding from a second side 164 of the first spar cap 160. The first wing 166 and the second wing 168 abut inner surfaces of the first thickened part 172 and the second thickened part 174 of the first aerodynamic shell part 136, respectively. The first spar cap 160 and the first and second wings 166, 168 may advantageously be dimensioned so that a small cavity 186 is created between the first spar cap 160 and the inner surface of the recess 176. An adhesive, such as an epoxy based glue, may have been applied to the surface of the recess 176 before arranging the first spar cap 160 in the recess 176. Alternatively, the adhesive may be injected into the cavity and then cured, in order to attach the first spar cap 160 to the recess 176 of the first aerodynamic shell part 136. The wings 166, 168 may act as a glue barrier so that only the needed glue may be injected into the cavity or that excess glue may be removed by injecting glue from one longitudinal end of the cavity 186 and collecting said excess glue at a second end of the cavity. It is clear that the wings 166, 168 do not necessarily have to extend along the entire longitudinal extent of the spar cap but only need to be positioned at various sections of the spar cap.

The first spar cap 160 extends in a longitudinal direction of the blade and forms a load carrying structure of the finished blade.

As shown in FIG. 3, the sides of the first thickened part 182 and the second thickened part 184 of the first aerodynamic shell part 136 are tapered towards the first recess 176. Equivalently the thickness of the spar cap 160 is tapered towards the first side 162 and the second side 164 of the spar cap 160. Preferably, the recess 176 and the spar cap 160 are formed so that sides thereof substantially abut each other so that a gradual transition between the two structures is obtained.

It is also clear that the spar cap 160 may be provided without the wings 166, 168. The cavity between the spar cap and the recess may still be formed by the tapered sides of the spar cap and the recess, e.g. by making the bottom surface of the spar cap slightly wider than the bottom surface of the recess.

FIG. 3 has been described with respect to a pressure side shell part 136 and a first spar cap 160. Equivalently a suction side she part as well as a second spar cap are manufactured separately and attached by adhesion to each other. The suction side shell also comprises a recess, and the second spar cap is arranged in the recess of the suction side shell part. The two shell parts (with attached spar caps) are then connected to each other, e.g. by forming bond lines along the leading edge and trailing edge of the shell parts and adhering them to each other. In addition, shear webs may be arranged between the spar caps in form of for instance I-shaped or C-shaped webs. In this setup the spar caps are then adhered to the shell parts before attaching the shear webs.

The resin for forming the aerodynamic shell part is preferably a vinyl ester or polyester based resin, since this enables the use of a gelcoat, whereby a number of post-moulding operations, such as painting, may be avoided.

Figure 4:
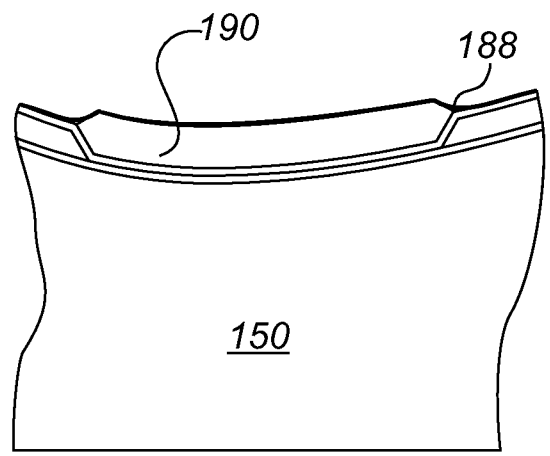
FIG. 4 shows a first embodiment for manufacturing an aerodynamic shell part according to the invention.

FIG. 4 illustrates a first method of forming the first recess 176 of the first aerodynamic shell part 136. In this embodiment a dummy insert 190 is arranged between the two thickened parts 172, 174. The dummy insert substantially has a shape that corresponds to that of the first spar cap 160. Preferably the dummy insert is slightly larger than the spar cap 160 in order to ensure that the spar cap 160 may indeed fit in the recess 176 afterwards. When manufacturing the first aerodynamic shell part 136, a vacuum bag is applied on top of the fibre material, sandwich core material and the dummy insert 190. By applying a vacuum to the vacuum cavity formed between the vacuum bag 188 and the first mould part 150, the dummy insert 190 is pressed against the fibre material, thus leaving the desired impression. By using the dummy insert 190 it is ensured that the recess 176 is properly aligned and that fibre material and sandwich core material does not slide down during layup. The dummy insert 190 is of course removed afterwards and before attaching the first spar cap 160.

Figure 5:
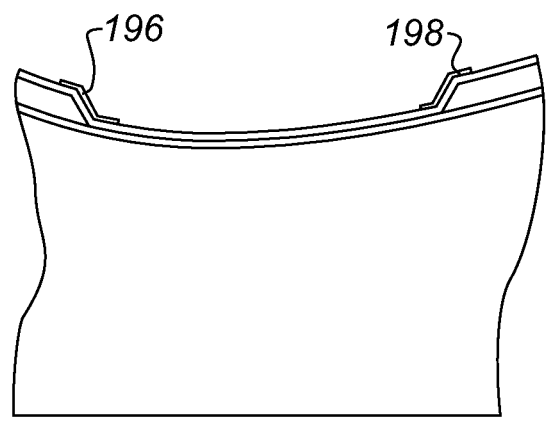
FIG. 5 shows a second embodiment for manufacturing an aerodynamic shell part according to the invention.

FIG. 5 illustrates a second method of forming the first recess 176 of the first aerodynamic shell part 136. In this embodiment, a first side insert 196 and a second side insert 198 are instead used for forming a first side and a second side of the first recess 176, respectively. The first aerodynamic shell part may as described in relation to the other embodiments be manufactured via a Vacuum Assisted Resin Transfer Moulding (VARTM) by arranging a vacuum bag on top of the fibre material, sandwich core material and side inserts.

FIG. 10-13 show various embodiments of kits of parts for manufacturing an aerodynamic shell part according to the invention.

FIGS. 10a-c show a first embodiment of the kit of parts according to the invention. The kit of parts comprises a first mould part 250 and a number of dummy inserts 290. The dummy inserts 290 are provided with guide pins 291, which can mechanically engage with holes 252 provided in the first forming surface of the first mould part 250. After the fibre layers that form skin layers of the aerodynamic shell have been laid up, the dummy inserts 290 are as shown in FIGS. 10b and 10c attached to the first mould part by inserting the guide pins 291 of the dummy inserts 290 into the holes 252 of the first mould part 250. Subsequently, the remaining parts that make up the aerodynamic shell may be arranged on the first forming surface of the first mould part 250. The dummy inserts 290 function so as to hold the material at the sides of the mould part 250 such that said material does not slide down and cause wrinkles in the finished structure. Further, they function so as to very accurately control the position of the recess in the finished aerodynamic shell part. The dummy inserts 290 may as shown in FIG. 10a be provided as separate modules, which each extend along different longitudinal parts of the recess. The dummy insert may also be arranged with a mutual spacing as shown in FIG. 10a.

FIGS. 11a-c show a second embodiment of the kit of parts according to the invention. The second embodiment is similar to the first embodiment, and like numeral refer to like parts. However, in this embodiment, a number of first side inserts 296 and second side inserts 298 are instead used for forming a first side and a second side of the first recess. Each of the insert parts may be attached to the forming surface via guiding pins or rods 293 to engaging holes in the forming surface of the first mould part 250'.

Figure 12:
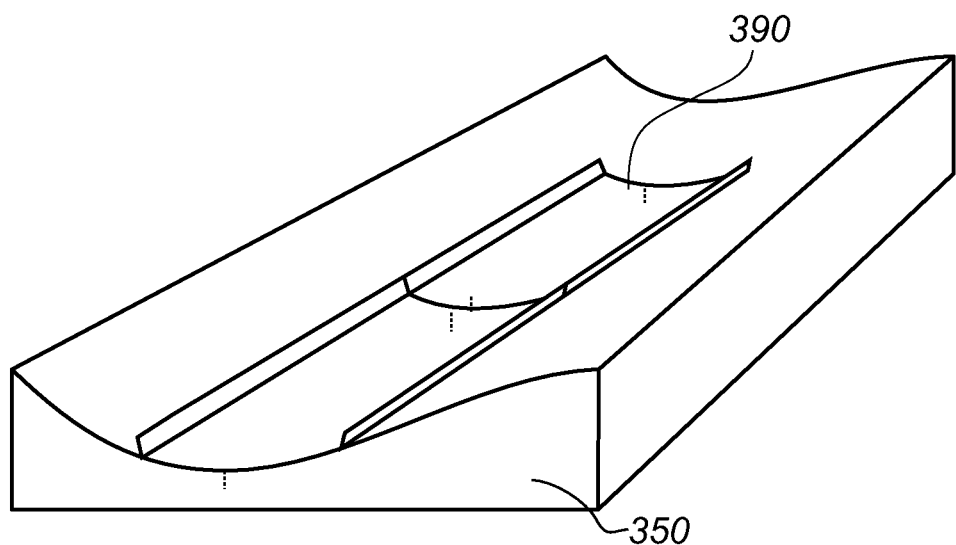
FIG. 12 shows a third embodiment of a kit of parts for manufacturing an aerodynamic shell part.

FIG. 12 shows a perspective view of a third embodiment of the kit of parts according to the invention. The third embodiment is similar to the first embodiment, and like numerals refer to like parts. The third embodiment differs from the first embodiment in that the sectionised inserts 390 adjoins each other so that they together correspond to the entire recess in the finished aerodynamic shell part. In the shown embodiment, the inserts only have a shape corresponding to the lower part of the spar cap that is to be inserted into the aerodynamic shell part. However, various shapes may be employed. It is of course also possible to utilise a combination of the first and the third embodiment by letting some inserts adjoin each other and other inserts be arranged with a mutual spacing between them.

Figure 13:
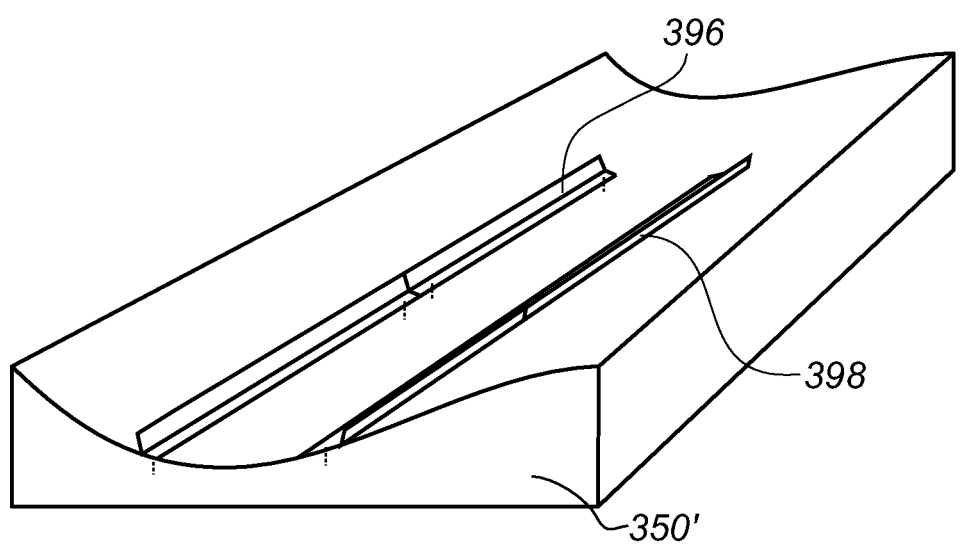
FIG. 13 shows a fourth embodiment of a kit of parts for manufacturing an aerodynamic shell part.

FIG. 13 shows a perspective view of a fourth embodiment of the kit of parts according to the invention, which is similar to the second embodiment, and wherein like numeral refer to like parts. The fourth embodiment differs in that individual first side inserts 396 are arranged to adjoin each other and together form the first side of the recess, whereas individual second side inserts 398 are arranged to adjoin each other and together form the second side of the recess.

The holes in the forming surface of the first to fourth embodiments, may be provided with a vacuum pump to apply vacuum, when vacuum is applied to the mould cavity. The holes may be provided with valve, which may be closed when resin is later injected into the mould cavity. The valves may after curing be re-opened so that the inserts may easily be removed again.

The inserts may be made of aluminium or a polypropylene material, or another material, which the resin does not adhere to. The inserts may be treated with wax or a non-slip material for easy removal of the inserts.

The use of guide holes will leave a hole in the aerodynamic shell part. However, this hole will be filled with resin or adhesive, when the spar cap is later inserted and bonded to the aerodynamic shell part. It may be necessary to carry out light repair after demoulding, e.g. by use of a simple gelcoat repair.

Further, the insert sections of the embodiments shown in FIGS. 10 and 11 may be connected by a flexible material, e.g. between the sides of the sectionised inserts so that the flexible material together with the insert sections form continuous side parts. These continuous side parts may help in providing boundaries which will help in layup of the fibre material and sandwich core material, thereby facilitating a very accurate position of the recess. The combined unit with insert sections and interconnected flexible material may be arranged in the mould similar to slats being positioned in a bed frame.

Figure 6:
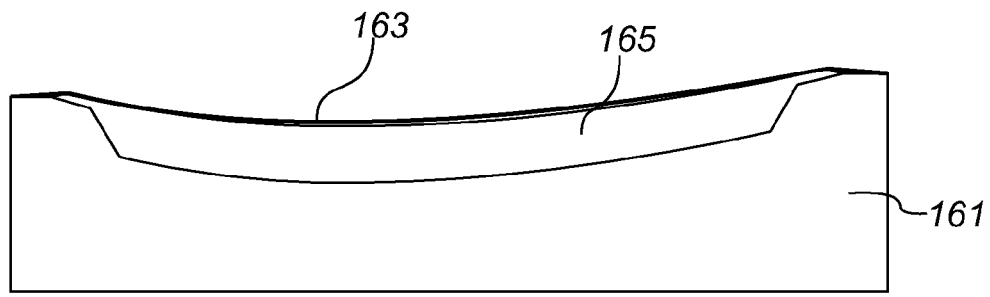
FIG. 6 shows an embodiment for manufacturing spar cap according to the invention.

FIG. 6 shows a cross-sectional view through a spar cap mould part 161 for use in a method of manufacturing the first spar cap 160. The spar cap mould part 161 comprises a forming surface that corresponds to the outer surface of the first spar cap 160. A number of fibre reinforcement layers (not shown) are arranged on top of the forming surface after which a vacuum bag 163 is applied on top of the fibre reinforcement layers in order to form a mould cavity 165 between the advantageously rigid, second mould part 161 and the vacuum bag 163. The mould cavity 165 is then evacuated by use of a vacuum source (not shown), after which resin is supplied to the mould cavity 165 via resin inlets (not shown) in order to wet the fibre reinforcement material. Finally, the resin is cured or at least pre-consolidated in order to form the pre-manufactured first spar cap 160.

Figure 7:
FIG. 7 shows a first embodiment of a spar cap according to the invention.

FIG. 7 shows a first embodiment of a spar cap according to the invention. In this embodiment, the entire spar cap is constituted by a fibre-reinforced polymer, advantageously being carbon fibres embedded in an epoxy matrix material. Thereby, the entire spar cap structure constitutes the load bearing structure (or main laminate) connected to the aerodynamic shell part of the blade.

Figure 8A:
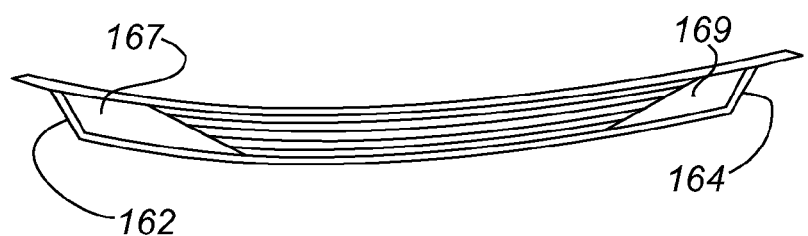
FIGS. 8a and 8b show a second and third embodiment of a spar cap according to the invention.

FIG. 8a shows a second embodiment of a spar cap according to the invention. This embodiment differs from the first embodiment in that a first sandwich core material 167 material is provided at the first side 162 of the spar cap 160, and a second sandwich core material 169 is provides at the second side 164 of the spar cap. Thus, the central part of the spar cap 160 comprising a plurality of stacked fibre-reinforcement layers, preferably comprising carbon fibres, constitutes the load carrying structure (or main laminate) connected to the aerodynamic shell part of the blade. In an advantageous embodiment, the first and the second sandwich core material 167, 169 are a foamed polymer. This provides the advantage that the balsawood of the thickened part of the aerodynamic shell may be electrically isolated from carbon fibres of the main laminate of the spar cap. The thickened part of the aerodynamic shell may also comprise a foamed polymer, at least in the region nearest the recess and the spar cap, in order to ensure the electrical insulation.

Figure 8B:
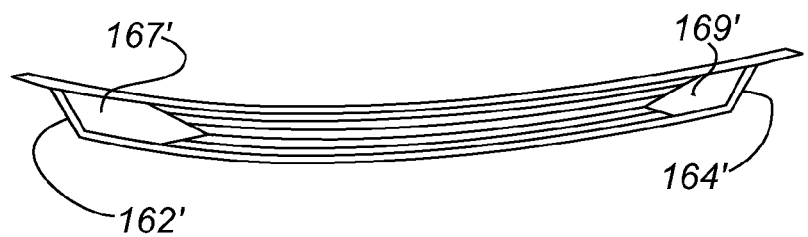

FIG. 8b shows a third embodiment of a spar cap according to the invention. This embodiment corresponds to the second embodiment where like reference numerals refer to like parts. The third embodiment differs from the second embodiment in that the sandwich core material 167', 169' at the sides 162', 164' are tapered so that they extend into the main laminate with fibre layers arranged both interior to and exterior to the tapered material.

Figure 9:
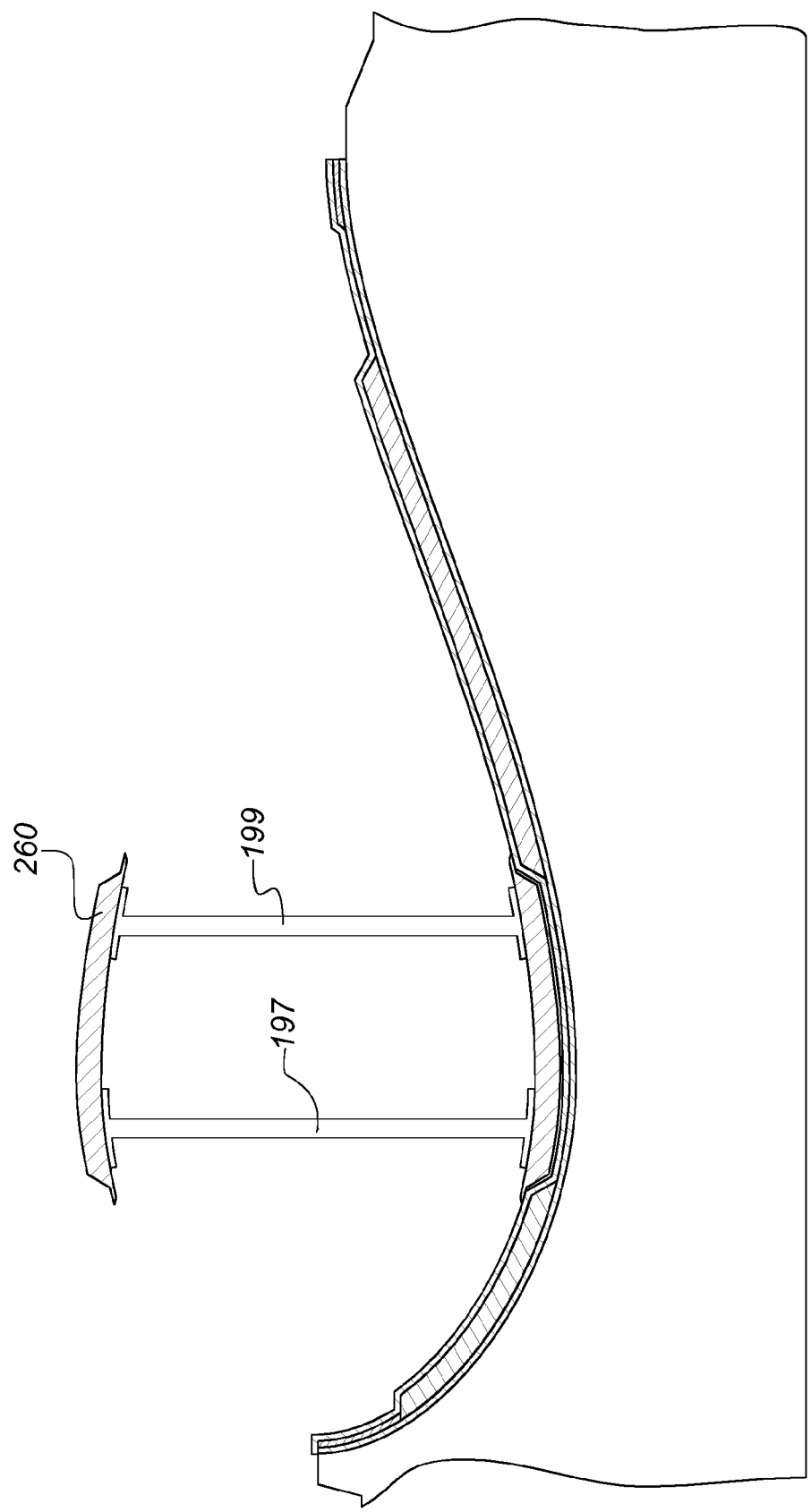
FIG. 9 shows another embodiment for manufacturing a wind turbine blade according to the invention.

FIG. 9 shows another embodiment for manufacturing a wind turbine blade according to the invention. This embodiment corresponds to the embodiment described in relation to FIG. 3, but with the difference that the load carrying structure is assembled before being attached to the first shell part. Accordingly, the load carrying structure comprising the first spar cap 160, a second spar cap 260, as well as a first shear web 197 and a second shear web 199 is assembled separately before being adhered to the first aerodynamic shell part. Subsequently, the second aerodynamic shell part (not shown) is arranged on top of the load carrying structure and the first aerodynamic shell part so that the second spar cap 260 is adhered to a recess of the second aerodynamic shell part, and the first and second shell parts are adhered to each other along bond lines at the leading edge and the trailing edge of the shell parts.

The invention has been described with reference to advantageous embodiments. However, the scope of the invention is not limited to the illustrated embodiment, and alterations and modifications can be carried out without deviating from the scope of the invention. The wind turbine blade has for instance been described with only a single recess and spar cap at each side of the blade. However, in particular for very large blades, the blade may comprise additional load carrying structures (or main laminates). Accordingly, embodiments having a longitudinal section, where the aerodynamic shell comprises two or more recesses on each side with separately manufactured spar caps arranged in and attached to the recesses, are also envisaged by the invention. In the description, the bonding between the spar cap and the aerodynamic shell has been described as an epoxy based adhesive. However, in an alternative embodiment, the spar cap is coated with a primer before being arranged in the recess of the aerodynamic shell. The primer may provide a chemical bonding to the vinylester or polyester of the aerodynamic shell. Thus, the curing of the blade shell may be performed after the spar cap has been arranged so at to provide the attachment to the spar cap. Also, it is possible to infuse the polyester or vinyl ester afterwards and then curing the structure.

| List of reference numerals | |
|---|---|
| 2 | wind turbine |
| 4 | tower |
| 6 | nacelle |
| 8 | hub |
| 10 | blade |
| 14 | blade tip |
| 16 | blade root |
| 18 | leading edge |
| 20 | trailing edge |
| 22 | pitch axis |
| 30 | root region |
| 32 | transition region |
| 34 | airfoil region |
| 36, 136 | pressure side shell |
| 38 | suction side shell |
| 40 | shoulder |
| 150 | first mould part |
| 160 | first spar cap |
| 161 | spar cap mould |
| 162 | first side of first spar cap |
| 163 | vacuum bag |
| 164 | second side of first spar cap |
| 165 | mould cavity |
| 166 | first lip/first wing/first protrusion |
| 167 | first sandwich core material |
| 168 | second lip/second wing/second protrusion |
| 169 | second sandwich core material |
| 170 | first aerodynamic shell part/pressure side shell part |
| 172 | first thickened portion |
| 174 | second thickened portion |
| 176 | first recess |
| 178 | outer skin layer(s) |
| 180 | inner skin layer(s) |
| 182 | first intermediate sandwich core material |
| 184 | second intermediate sandwich core material |
| 186 | cavity between first spar cap and recess of first aerodynamic shell |
| 188 | vacuum bag |
| 190 | dummy insert |
| 192 | leading edge reinforcement |
| 194 | trailing edge reinforcement |
| 196 | first side insert |
| 197 | first shear web |
| 198 | second side insert |
| 199 | second shear web |
| 250, 250', 350, 350' | first mould part |
| 252, 293, 295, 352, 393, 395 | guide holes |
| 260 | second spar cap |
| 290, 390 | dummy inserts |
| 296, 396 | first side inserts |
| 298, 398 | second side inserts |

The invention claimed is:

1. A method of manufacturing an aerodynamic shell part for a wind turbine blade, the aerodynamic shell part comprising a recess for arrangement and connection of a spar cap within said recess, said method comprising the steps of:
   providing a first mould part having a first forming surface that defines a part of an exterior of the aerodynamic shell part,
   laying up fibre-reinforcement material and an optional sandwich core material in the first mould on the first forming surface, arranging one or more inserts having an exterior shape corresponding to at least sides of the recess of the aerodynamic shell part, supplying resin to said fibre-reinforcement material and optional sandwich core material, curing or preconsolidating the resin, and removing the one or more inserts.

2. A method according to claim 1, wherein the one or more inserts have an exterior shape that corresponds at least to an outer surface of the spar cap.

3. A method according to claim 1, wherein the one or more inserts comprise a first insert that forms at least a part of a first side of the recess, and a second insert that forms at least a part of a second side of the recess.

4. A method according to claim 3, wherein a releasing material, such as a waxy substance, is applied to said one or more insert in order to prevent said one or more inserts to adhere to material of the aerodynamic shell.

5. A method according to claim 4, the wherein the method comprises the use of vacuum infusion.

6. A method according to claim 5, wherein one or more vacuum bags is applied over the fibre-reinforcement material and the optional sandwich core material as well as one or more inserts, and sealed to the first mould part.

7. A method according to claim 5, wherein a first vacuum bag is applied over the fibre-reinforcement material and the optional sandwich core material, and wherein the one or more inserts are arranged on top of the first vacuum bag, and wherein a second vacuum bag is arranged on top of the one or more inserts.

8. A method according to claim 7, wherein the one or more inserts extend along the entire longitudinal extent of the recess.

9. A method according to claim 8, wherein the one or more inserts each form a separate longitudinal section of the recess.

10. A method according to claim 9, wherein the one or more inserts are arranged so that they adjoin each other.

11. A method according to claim 9, wherein the one or more inserts are arranged with a mutual spacing in the longitudinal direction.

12. A kit of parts for manufacturing an aerodynamic shell part of a wind turbine blade, the aerodynamic shell part comprising a recess for arrangement and connection of a spar cap within said recess, the kit of parts comprising:

a first mould part having a first forming surface that defines a part of an exterior of the aerodynamic shell part, and one or more inserts having an exterior shape corresponding to at least sides of the recess of the aerodynamic shell part.

13. A kit of parts according to claim 12, wherein the first mould part comprises alignment means, such as markings, for arranging and aligning the one or more inserts on the first forming surface.

14. A kit of parts according to claim 13, wherein the first moulding surface and the one or more inserts are provided with mating connection means so that the one or more inserts may be connected to the first moulding surface of the first mould part.

15. A kit of parts according to claim 14, wherein the first moulding surface is provided with openings, and wherein the one or more inserts are provided with attachment means that may engage with the openings in the first moulding surface.

\* \* \* \* \*

UNITED STATES PATENT AND TRADEMARK OFFICE
CERTIFICATE OF CORRECTION

PATENT NO.        : 9,599,094 B2
APPLICATION NO.   : 14/649845
DATED             : March 21, 2017
INVENTOR(S)       : Martin Dahl and Lars Nielsen It is certified that error appears in the above-identified patent and that said Letters Patent is hereby corrected as shown below:

In the Claims

Claim 4, Column 19, Line 3, please replace "insert" with "inserts".
Claim 6, Column 19, Line 2, please replace "is" with "are".

Signed and Sealed this
Ninth Day of May, 2017

Michelle K. Lee
*Director of the United States Patent and Trademark Office*